(12) United States Patent
Potocki et al.

(10) Patent No.: US 11,318,563 B2
(45) Date of Patent: May 3, 2022

(54) SYSTEM AND METHOD FOR HIGH OUTPUT LASER TRIMMING

(71) Applicants: John Richard Potocki, Armada, MI (US); Alexander Zak, Troy, MI (US)

(72) Inventors: John Richard Potocki, Armada, MI (US); Alexander Zak, Troy, MI (US)

(73) Assignee: Magna International Inc., Aurora (CA)

( * ) Notice: Subject to any disclaimer, the term of this patent is extended or adjusted under 35 U.S.C. 154(b) by 658 days.

(21) Appl. No.: 16/246,694

(22) Filed: Jan. 14, 2019

(65) Prior Publication Data

US 2019/0143455 A1 May 16, 2019

Related U.S. Application Data

(63) Continuation of application No. 15/035,579, filed as application No. PCT/US2014/064765 on Nov. 10, 2014, now Pat. No. 10,213,876.

(Continued)

(51) Int. Cl.
| | |
|---|---|
| B23K 26/08 | (2014.01) |
| B23K 26/12 | (2014.01) |
| B23K 26/36 | (2014.01) |
| B23K 26/38 | (2014.01) |
| B23K 37/00 | (2006.01) |
| B23K 26/10 | (2006.01) |
| B23K 26/361 | (2014.01) |
| B23K 26/40 | (2014.01) |
| B23K 101/00 | (2006.01) |
| B23K 101/04 | (2006.01) |
| B23K 101/18 | (2006.01) |

(Continued)

(52) U.S. Cl.
CPC ............ *B23K 26/38* (2013.01); *B23K 26/083* (2013.01); *B23K 26/0853* (2013.01); *B23K 26/0884* (2013.01); *B23K 26/10* (2013.01); *B23K 26/127* (2013.01); *B23K 26/361* (2015.10); *B23K 26/40* (2013.01); *B23K 37/006* (2013.01); *B23K 2101/006* (2018.08); *B23K 2101/04* (2018.08); *B23K 2101/18* (2018.08); *B23K 2103/04* (2018.08); *B23K 2103/10* (2018.08)

(58) Field of Classification Search
CPC ............ B23K 26/08–082; B23K 26/12; B23K 26/127–128; B23K 26/36; B23K 26/38; B23K 26/50
See application file for complete search history.

(56) References Cited

U.S. PATENT DOCUMENTS

| | | |
|---|---|---|
| 5,007,784 A | 4/1991 | Genov |
| 6,204,469 B1 | 3/2001 | Fields |
| 6,621,091 B2 | 9/2003 | Pratt |

*Primary Examiner* — Michael A Laflame, Jr.
(74) *Attorney, Agent, or Firm* — Dickinson Wright PLLC

(57) ABSTRACT

A system and method for laser cutting a plurality of parts, for example metal chassis components, using a plurality of laser cutting apparatuses is provided. The system includes a plurality of the laser cutting apparatuses disposed in a single enclosed cell for simultaneously trimming multiple parts. The system also includes at least one inner chamber and at least one set of double doors for transferring the parts in and out of the enclosed cell without any light escaping the cell. The parts are conveyed through the first door to the inner chamber while the second door is closed, and through the second door to the enclosed cell while the first door is closed. The system also includes robots continuously preloading and unloading the parts to maximize the laser trimming time.

17 Claims, 7 Drawing Sheets

Related U.S. Application Data

(60) Provisional application No. 61/902,861, filed on Nov. 12, 2013.

(51) Int. Cl.
    *B23K 103/04*     (2006.01)
    *B23K 103/10*     (2006.01)

SYSTEM AND METHOD FOR HIGH OUTPUT LASER TRIMMING

CROSS-REFERENCE TO PRIOR APPLICATIONS

This U.S. Continuation Patent Application claims the benefit of U.S. National Stage patent application Ser. No. 15/035,579, filed May 10, 2016, which claims the benefit of PCT International Patent Application Serial No. PCT/US2014/064765, filed Nov. 10, 2014 and entitled "System and Method for High Output Laser Trimming," which claims the benefit of U.S. Provisional Patent Application Ser. No. 61/902,861, filed Nov. 12, 2013 and entitled "System and Method for High Output Laser Trimming," the entire disclosures of the applications being considered part of the disclosure of this application and hereby incorporated by reference.

BACKGROUND OF THE INVENTION

1. Field of the Invention

The invention relates generally to a system and method for high output laser cutting.

2. Related Art

A laser cutting apparatus, such as a robotic laser, is often used to trim or otherwise cut parts formed from sheet metal, such as tubes, B-pillars, and other chassis components for automotive vehicles. The robotic laser can comprise any type of laser capable of cutting the metal material, for example a fiber laser, disc laser, or neodymium-doped yttrium aluminum garnet ($Nd:Y_3Al_5O_{12}$) laser. A computer numeric controlled (CNC) arm including a laser can alternatively be used to trim the metal parts. Such cutting processes are conducted in an enclosed cell so that humans are not exposed to light from the laser, which could be harmful.

Laser cutting using the robot or CNC arm typically provides accurate and precise results. However, the equipment and floor space needed to conduct the laser cutting process requires high capital costs. In addition, since the laser should not operate when any doors to the enclosed cell are open, process time is lost each time the metal part is moved into or out of the cell.

SUMMARY OF THE INVENTION

The invention comprises a laser cutting system for cutting a plurality of parts with reduced capital costs and reduced process time. The system includes a cell enclosed by a plurality of first walls, and at least one laser cutting apparatus disposed in the enclosed cell. At least one inner chamber with a pair of double doors is disposed along the enclosed cell. The inner chamber is enclosed by at least one of the first walls and at least one second wall. The double doors include a first door disposed along one of the first walls enclosing the inner chamber for allowing the parts to pass therethrough, and a second door disposed along one of the second walls enclosing the inner chamber also for allowing the parts to pass therethrough. Only one of the doors is open at a time while the laser cutting apparatus cuts the parts.

Prior to cutting a first part, the first part passes through one of the double doors and enters the inner chamber while the second door is closed. Next, the first part passes through the second door and enters the enclosed cell while the first door is closed. Since only one door is open at a time, light from the laser does not escape the enclosed cell. Thus, the laser cutting apparatus can continue cutting the first part while a second part enters or exits the cell to maximize the laser cutting time, also referred to as "laser on time."

The invention also provides a method for laser cutting a plurality of parts. The method includes laser cutting at least one first part in the enclosed cell, maintaining at least one second part in the enclosed cell adjacent the at least one first part while laser cutting the at least one first part, and laser cutting the least one second part in the enclosed cell. The method further includes transferring at least one third part through the first door and into the inner chamber while laser cutting the at least one first part or the at least one second part and while the second door connecting the inner chamber to the enclosed cell is closed. The double door system prevents the laser light from escaping and potentially contacting a human located outside of the enclosed cell.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF EXAMPLE EMBODIMENTS

Figure 1:
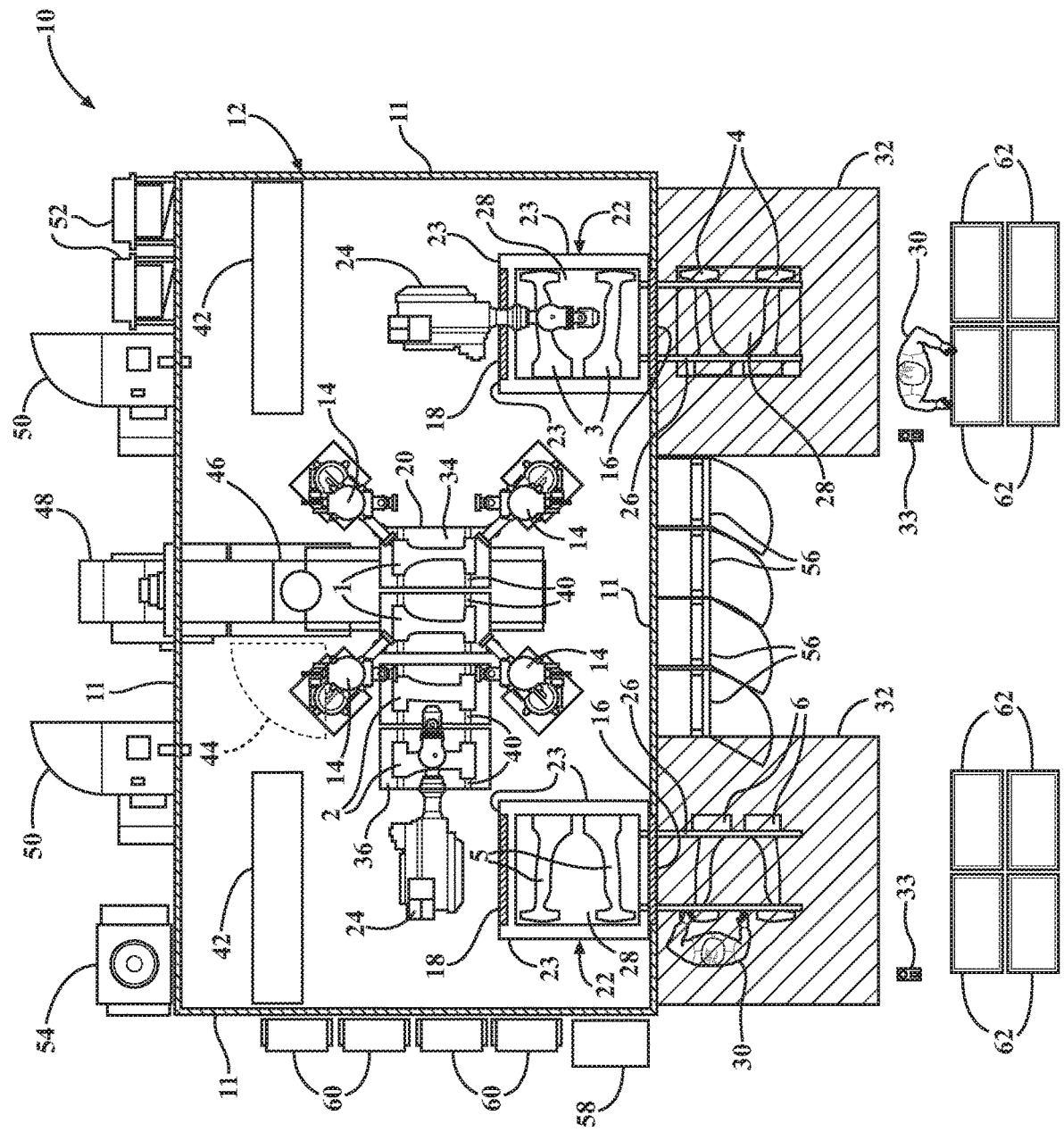
FIG. 1 is a plan view of a robotic laser cutting system according to one exemplary embodiment.

The invention provides a high output system 10 for laser cutting various parts, such as tubes, B-pillars, and other chassis components for automotive vehicles. FIG. 1 is a plan view of the system 10 according to one exemplary embodiment. The exemplary system 10 includes a single enclosed cell 12 containing at least one laser cutting apparatus 14 for cutting the parts, and typically a plurality of the laser cutting apparatuses 14 in the single enclosed cell 12. The laser cutting apparatuses 14 typically include a robotic laser. However, the system 10 could alternatively employ at least two computer numeric controlled (CNC) arms each including a laser, instead of or in addition to the robotic lasers. Also, although the exemplary laser cutting system 10 is typically used to trim parts formed of metal, such as steel or aluminum, the system 10 could also be used to cut parts formed of other materials. In one exemplary embodiment, the system 10 is used to laser cut parts formed by high pressure die casting (HPDC) of aluminum or an aluminum alloy. In another embodiment, the system 10 is used to laser cut parts formed by low pressure die casting (LPDC) of aluminum or an aluminum alloy. The laser cutting step typically includes laser trimming the parts, but could include other types of cutting.

The system 10 includes at least one set of double doors 16, 18 for allowing the parts to enter and exit the enclosed cell 12 without letting any laser light escape the enclosed cell 12. Thus, the laser cutting apparatuses 14 can continuously trim one or more parts while other parts enter and exit the enclosed cell 12.

The exemplary system shown in FIG. 1 includes four laser cutting apparatuses 14 trimming the parts, but the system 10 could alternatively include any number of laser cutting apparatuses 14, depending on the output desired, size and number of parts to be trimmed, and the available resources. In this embodiment, the laser cutting apparatuses 14 are robotic lasers, and two of the robotic lasers simultaneously trim one part while the other two robotic lasers simultaneously trim another part. The system 10 is capable of cutting one to ten parts at a time, depending on the number of laser cutting apparatuses 14 and the size of the parts. Disposing a plurality of the laser cutting apparatuses 14 in the single enclosed cell 12 and cutting each part with multiple laser cutting apparatuses simultaneous and/or simultaneously cutting multiple parts provides for a shorter cutting time per part and reduces the required floor space, compared to systems with only one laser cutting apparatus 14 per enclosed cell 12.

Figure 4:
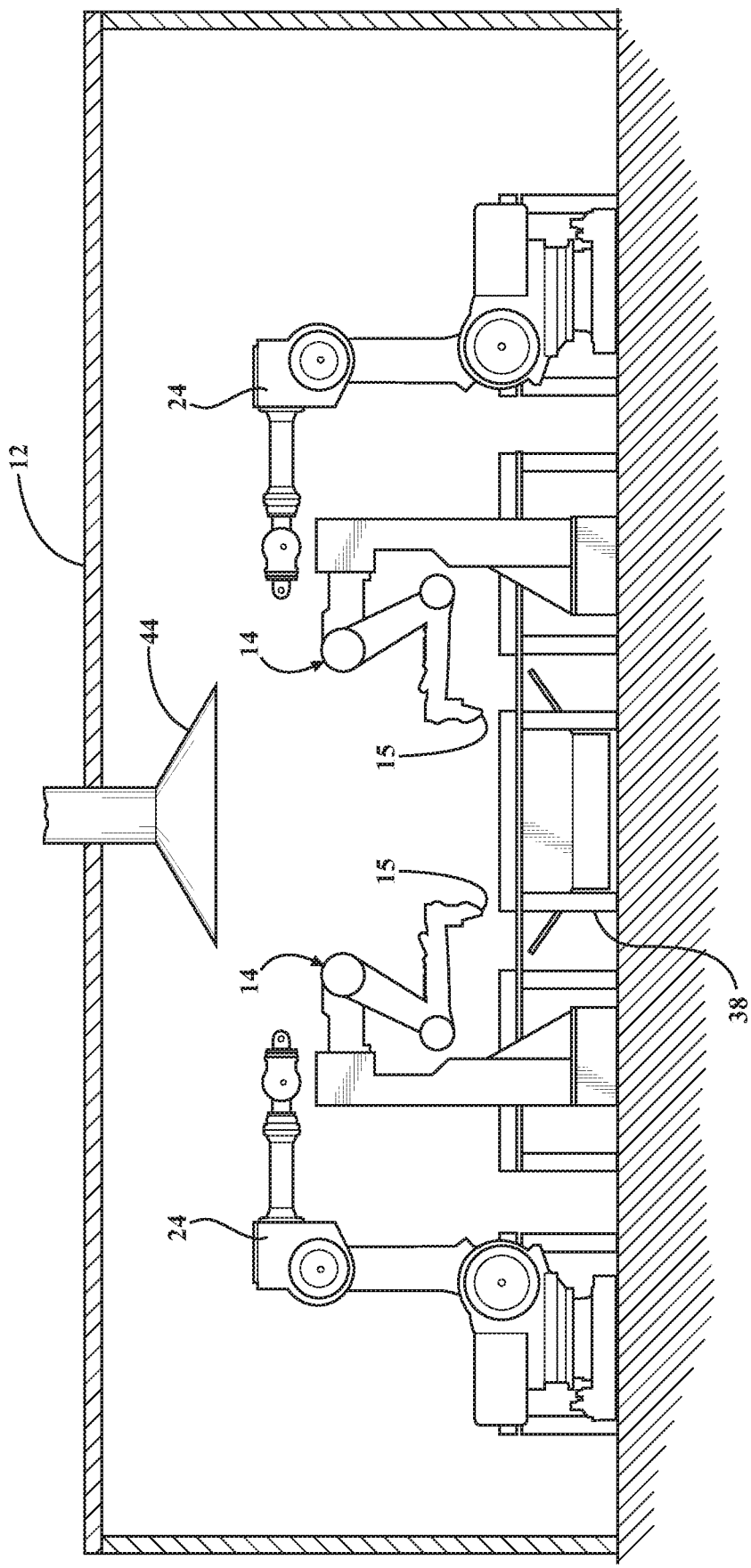
FIG. 4 is a front cross-sectional view of the enclosed cell according to an exemplary embodiment.

The robotic lasers or lasers attached to the CNC arms can comprise any type of laser capable of cutting metal, for example a fiber laser, disc laser, or neodymium-doped yttrium aluminum garnet (Nd:$Y_3Al_5O_{12}$) laser. The laser cutting apparatuses 14 of the exemplary embodiment surround a cutting station 20 and are preferably coupled to a frame (not shown) and mounted to the ceiling of the enclosed cell 12. Alternatively, the laser cutting apparatuses 14 could be disposed on the floor of the enclosed cell 12, as shown in FIG. 4. Each robotic laser of the exemplary embodiment includes a laser cutting head 15, also shown in FIG. 4, for cutting the metal parts. The cell 12 containing the laser cutting apparatuses 14 is enclosed by a plurality of walls 11, referred to as first walls, which prevent any laser light from escaping the enclosed cell 12. Due to the plurality of laser cutting apparatuses 14 in the single enclosed cell 12, the system 10 requires less floor space and provides a shorter process time, compared to systems with only one laser cutting apparatuses per cell.

The system 10 also includes at least one inner chamber 22 and at least one set of the double doors 16, 18 for allowing the parts to enter and exit the enclosed cell 12 without any laser light escaping the enclosed cell 12. In the exemplary embodiments, the system 10 includes one inner chamber 22 on each side of the laser cutting station 20, and thus one set of double doors 16, 18 on each side of the cutting station 20. Each set of double doors 16, 18 includes a first door 16 and a second door 18. Each inner chamber 22 is located between one of the first doors 16 and one of the second doors 18. The inner chamber 22 is also enclosed by walls 23, referred to as second walls, to prevent any laser light that happens to enter the inner chamber 22 from escaping. In the exemplary embodiment of FIG. 1, the first doors 16 are disposed along the same first wall 11 of the enclosed cell 12, and the first doors 16 connect the inner chambers 22 to a part loading area 32. The second doors 18 are each disposed along a second wall 23 facing parallel to the first door 16 and connect the inner chambers 22 to the enclosed cell 12. During operation of the laser cutting system 10, a part is conveyed through the first door 16 while the second door 18 is closed. Next, the first door 16 closes, and the part is conveyed through the second door 18 into the enclosed cell 12 while the first door 16 is closed.

Figure 2:
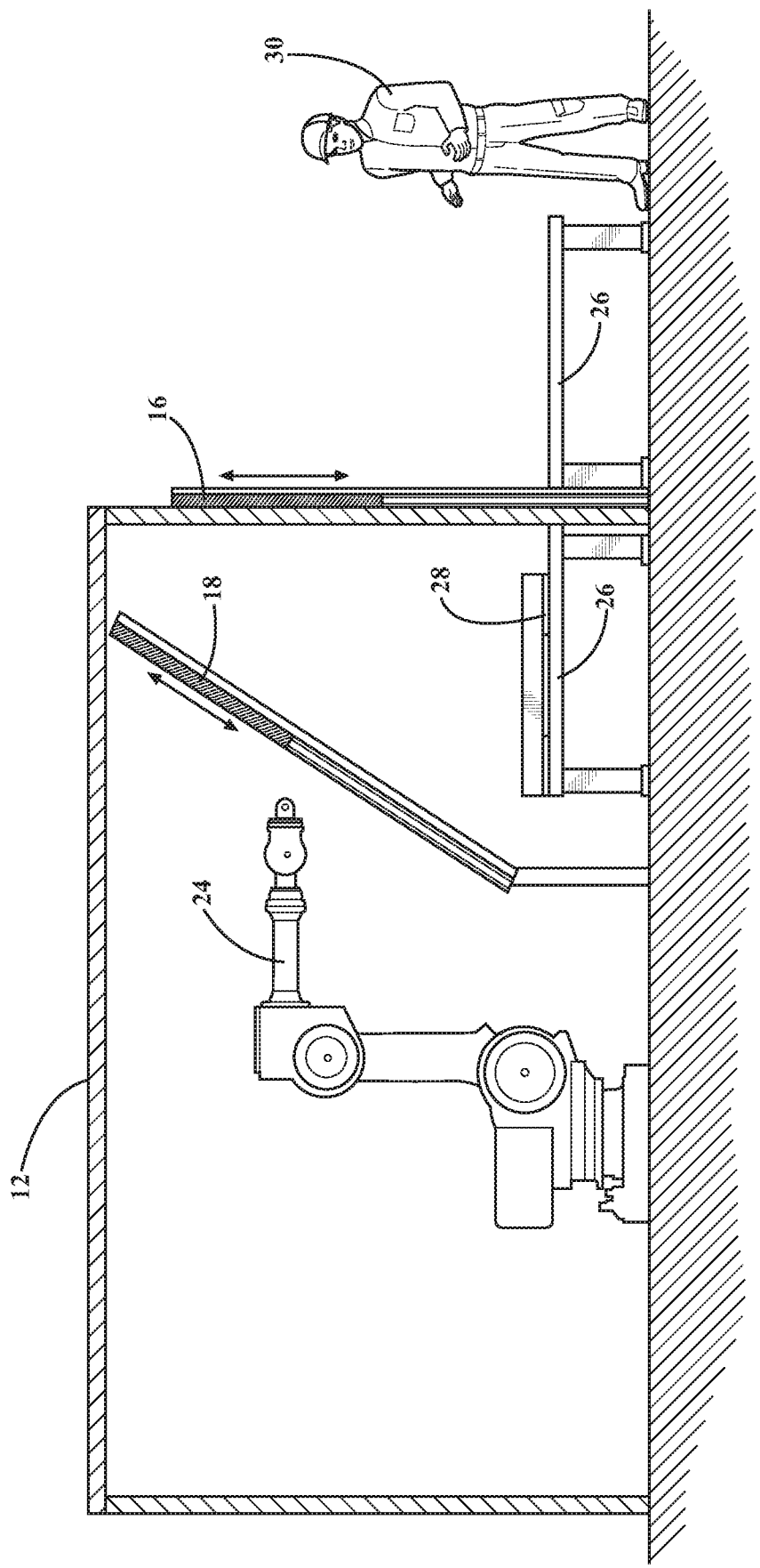
FIG. 2 is a side view of an enclosed cell showing double doors according to the exemplary embodiment.
Figure 3:
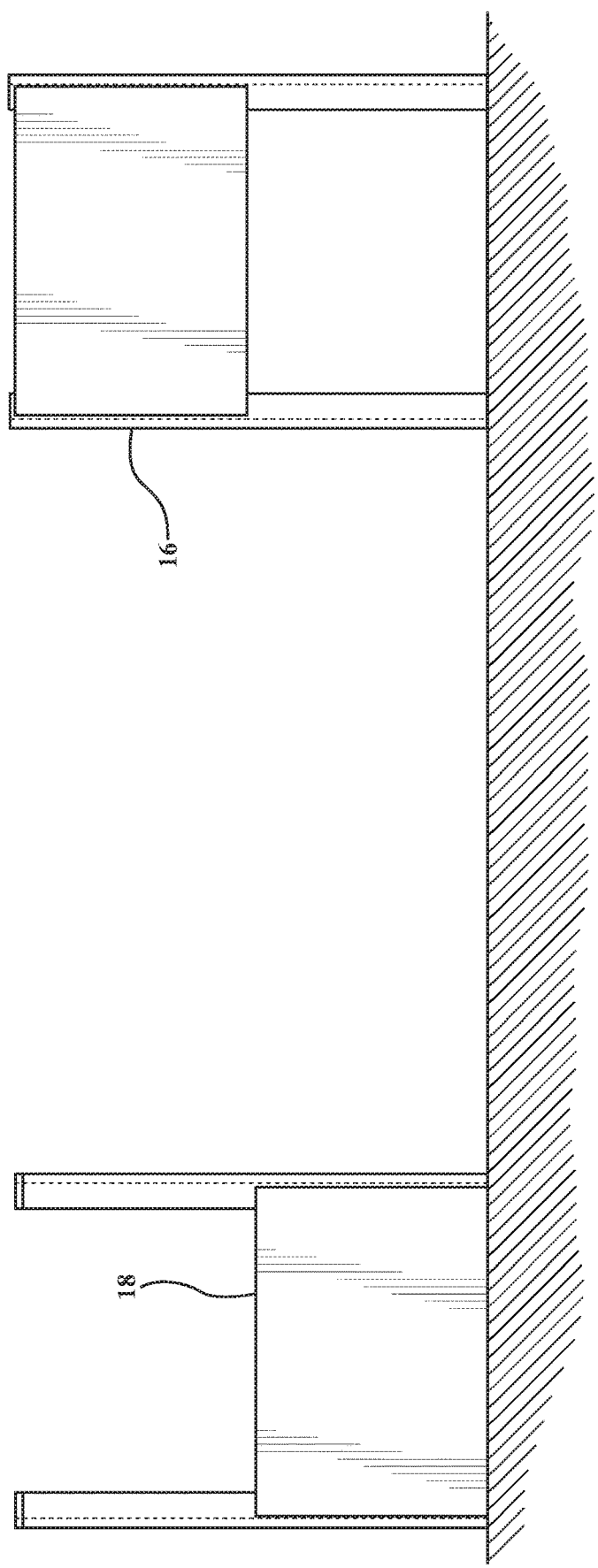
FIG. 3 is a front view of two sets of the double doors according to the exemplary embodiment.

FIG. 2 is a side view of the double doors 16, 18, the inner chamber 22, and the enclosed cell 12 of the system 10 according to one exemplary embodiment, wherein the doors 16, 18 are sliding doors. The first door 16 is disposed vertically relative to the ground and slides up and down allowing the parts to enter and exit the inner chamber 22. The second door 18 is disposed at an angle relative to the ground and relative to the first door 16. The second door 18 also slides up and down allowing the parts to enter and exit the enclosed cell 12. Disposing the second door 18 at an angle allows a robot 24 to conveniently lift the parts out of the inner chamber 22 and place the parts back in the inner chamber 22 after they have been trimmed. The doors 16, 18 can be designed such that the opening is above the door 16, 18, as shown on the left side of FIG. 3, or below the door, as shown on the right side of FIG. 3. In the system 10 of FIG. 1, the opening is preferably below the first door 16 to allow the parts to slide under the first door 16, and the opening is preferably above the second door 18 to allow the robot 24 to lift the parts above the second door 18, in and out of the inner chamber 22.

Although the exemplary system 10 of FIG. 1 is shown with two inner chambers 22 and thus two sets of double doors 16, 18, the system 10 could alternatively include one or more sets of double doors 16, 18. In addition, the inner chambers 22 are typically located inside of the enclosed cell 12, such that the first doors 16 are disposed along the first walls 11, and the second walls 23 enclosing the inner chambers 22 and second walls 23 are located inside of the first walls 11. However, although not shown, the inner chambers 22 could be located outwardly of the enclosed cell 12, in which case, the second doors 18 and second walls 23 enclosing the inner chambers 22 are located outside of the first walls 11 and first doors 16.

Also in the exemplary embodiment of FIG. 1, a load slide 26 and loading platforms 28 are located adjacent to each set of double doors 16, 18. One loading platform 28 is disposed on each load slide 26. Another loading platform 28 can be disposed below the load slide 26 for storing parts to be loaded, as shown on the right side of FIG. 1. The parts are placed on the loading platforms 28 and the load slides 26 convey the loading platforms 28 and parts through the double doors 16, 18. Each load slide 26 moves through the associated first door 16, in and out of the inner chamber 22, while the associated second door 18 is closed. Alternatively, another means could be used to convey the parts into and out of the enclosed cell 12.

FIG. 1 also shows a human operator 30 loading and unloading the metal parts to and from the part loading platforms 28. The part loading area 32 adjacent to each of the load slides 26, which is shown in FIG. 1 with hatched lines, is continuously scanned by a safety laser (not shown) to assure that no human or object is in the path of the load slide 26. When the safety laser detects a human or object in the loading area 32, the load slide 26 is prohibited from moving. Once the operator 30 loads or unloads the metal parts from the part loading fixture 28, he or she steps out of the loading area 32 and hits a palm button 33 allowing the load slide 26 to move again.

The exemplary system 10 of FIG. 1 also includes the robots 24 for transferring the parts from the loading platforms 28 to the laser cutting station 20. In the embodiment of FIG. 1, the robots 24 are material handling robots (M-H robots), but the robots 24 could comprise another device capable of automatically transferring the parts to and from the laser cutting station 20. In FIG. 1, one robot 24 is located between a first one of the inner chambers 22 and the laser cutting station 20, and another robot 24 is located between a second one of the inner chambers 22 and the laser cutting station 20 such that parts can be conveyed to and from both inner chambers 22 simultaneously. However, the system 10 could be designed without the robots 24. For example, the load slide 26 or a conveyor could convey the parts directly from the inner chamber 22 to the laser cutting station 20.

The system 10 of FIG. 1 includes cutting platforms 34, 36 disposed on a conveyor 38 (shown in FIG. 4) which extends from the robots 24 to the laser cutting station 20 for transferring the parts to and from the laser cutting station 20. The cutting platforms 34, 36 and conveyor 38 are designed such that a first cutting platform 34 is disposed at the laser cutting station 20 below the laser cutting apparatus 14 while a second cutting platform 36 is disposed to the left of the laser cutting station 20. Each platform 34, 36 includes a part setting fixture 40 for maintaining the parts precisely in a predetermined position for laser cutting. Each part setting fixture 40 typically includes a plurality of locating pins and clamps for holding the parts in the predetermined position. The design of the part setting fixture 40 varies depending on the type of part to be trimmed or otherwise cut. However, the part setting fixture 40 preferably includes no clamps in the cutting path, such that the laser cutting apparatuses 14 can continuously trim or otherwise cut the parts without stopping. During operation, the robots 24 transfer the parts from the inner chambers 22 to the cutting platforms 34, 36 and vice versa, and the cutting platforms 34, 36 slide along the conveyor 38 to and from the laser cutting station 20.

FIG. 1 shows a first pair of parts 1 disposed on the first cutting platform 34 at the cutting station 20 beneath the laser cutting apparatuses 14, and a second pair of parts 2 preloaded on the second cutting platform 36 to the left of the cutting station 20. The laser cutting apparatuses 14 trim the first pair of parts 1 while the second pair 2 of parts waits to the left of the cutting station 20. Once the first pair of parts 1 is trimmed, both cutting platforms 34, 36 immediately slide to the right such that the second cutting platform 36 and the second pair of parts 2 are disposed at the cutting station 20. The second pair of parts 2 is then trimmed, and while the second pair of parts 2 is being trimmed, the robot 24 on the right side of the cutting station 20 unloads the previously trimmed first pair of parts 1 from the first cutting platform 34 and places them in the inner chamber 22. In the meantime, an untrimmed third pair of parts 3 has already been placed on the load slide 26, and the third pair of parts 3 is waiting in the inner chamber 22. The robot 24 then lifts the untrimmed third pair of parts 3 from the inner chamber 22 and preloads them on the first cutting platform 34. Once the second pair of parts 2 is trimmed, the cutting platforms 34, 36 slide to the left such that the first cutting platform 34 and the untrimmed third pair of parts 3 are located at the cutting station 20 and the second cutting platform 36 and the trimmed second pair of parts 2 are located to the left of the cutting station 20. The third pair of parts 3 is then trimmed.

Next, the previously trimmed second pair of parts 2 is unloaded by the robot 24 on the left side of the cutting station 20 while the third pair of parts 3 is trimmed. The preloading, cutting, and unloading steps are repeated continuously to maximize the laser cutting time, referred to as the "laser on time." The only time the laser cutting apparatuses 14 are off is when the cutting platforms 34, 36 are sliding the parts along the conveyor 38, which is a very short period of time because there is always a preloaded pair of parts waiting adjacent the cutting station 20. Otherwise, the laser cutting apparatuses 14 are constantly on and cutting the parts.

The system 10 of FIG. 1 also includes other components which assist or improve the laser cutting process. For example, tool stands 42 are located inside the enclosed cell 12 so that the laser cutting apparatuses 14 can automatically change tools, such as their respective end effectors, in order to trim various different parts. A ventilation system 44 is also located inside of the enclosed cell 12. In the embodiment of FIG. 1, the ventilation system 44 is a 360° dust removal system coupled to the frame connecting the laser cutting apparatuses 14 to the ceiling of the enclosed cell 12. The 360° dust removal system efficiently removes dust, smoke, light particles, and heavy particles from the enclosed cell 12. The ventilation system 44 could alternatively be an air duct disposed over the laser cutting station 20, as shown in FIG. 4. A scrap conveyor 46 also extends from the laser cutting station 20 to a waste container 48 for removing scrap metal from the cell 12. The scrap conveyor 46 extends through the walls of the cell 12 to the waste container 48 which is located outside of the enclosed cell 12. Also, in proximity to the enclosed cell 12, is a plurality of laser power sources 50; densification packages 52 with air valves, water valves, and filter dryers for supplying clean air and water; and a chiller 54 for cooling water to keep the laser cutting apparatuses 14 and specifically the laser cutting heads 15 of the robotic lasers at suitable temperatures. In addition, racks 62 for holding the untrimmed and trimmed parts are located outside of the enclosed cell 12, adjacent to the loading areas 32.

A master control panel 58 is located outside of the enclosed cell 12 for controlling all of the components of the system 10, including the laser cutting apparatuses 14, robots 24, doors 16, 18, load slides 26, conveyors 38, 46, and safety systems. The components of the system 10 can be controlled automatically or semi-automatically, depending on the desired output and resources available. In one preferred embodiment, the master control panel 58 controls and replaces the components automatically or semi-automatically. A power distribution panel 60 is disposed adjacent the master control panel 58. Control boxes 56 for the laser cutting apparatuses 14 are typically located between the two load slides 26 outside of the enclosed cell 12. The control boxes 56 are connected to the master control panel 58 and are accessible to the operators 30.

As stated above, the laser cutting system 10, including the double doors 16, 18 and the plurality of laser cutting apparatuses 14, can be modified in view of available resources and desired output. For example, the system 10 could include only one pair of double doors 16, 18 and one inner chamber 22. In addition, a single load slide 26 or conveyor 38 could convey the parts directly from the inner chamber 22 to the laser cutting station 20 without the robots 24.

Figure 5:
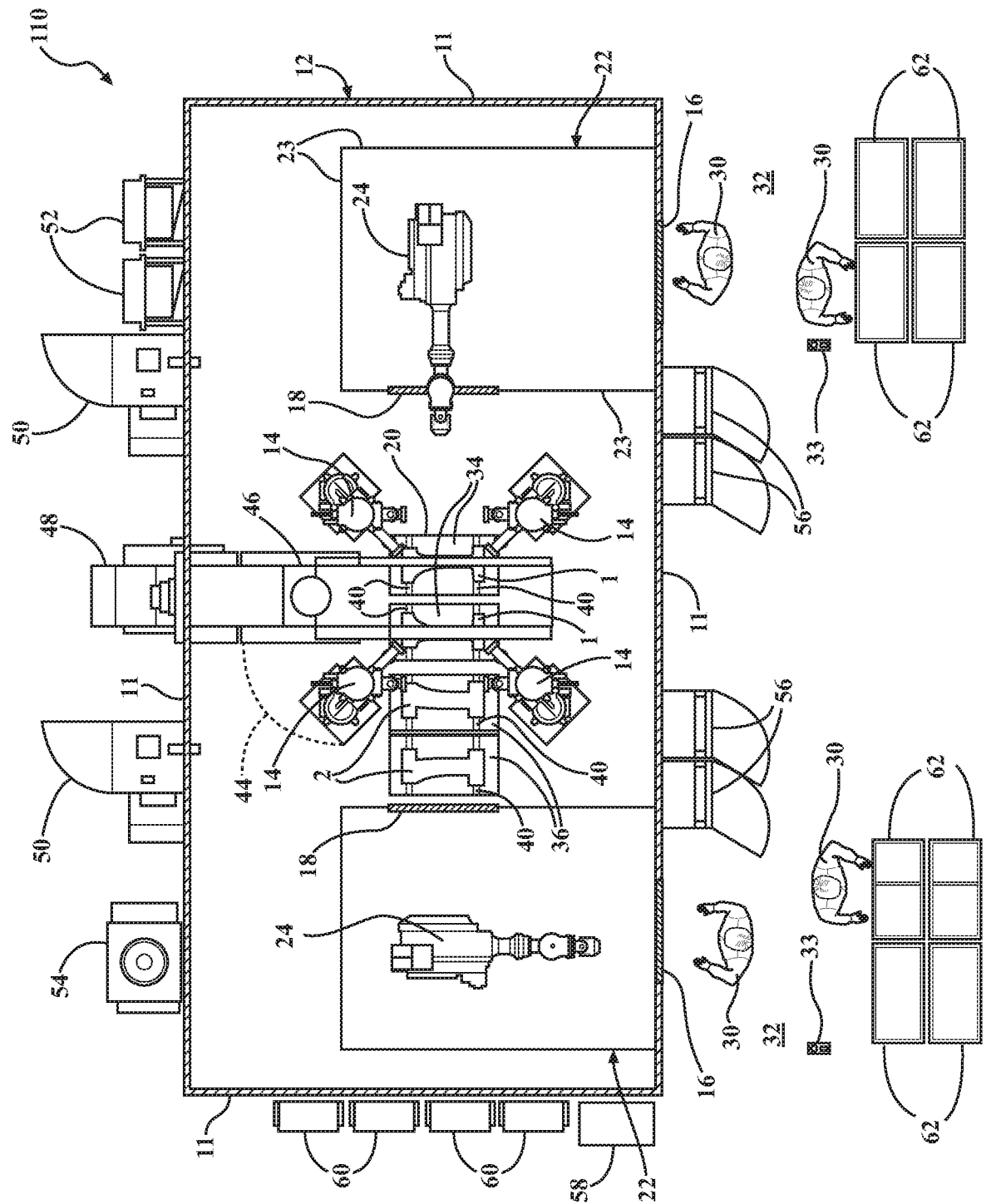
FIG. 5 is a plan view of the robotic laser cutting system according to a second exemplary embodiment.

FIG. 5 illustrates the laser cutting system 110 according to another exemplary embodiment, which is less automatic and requires more labor than the laser cutting system 10 of FIG. 1. Like the system 10 of FIG. 1, the system 110 of FIG. 5 includes two laser cutting apparatuses 14 simultaneously trimming one part while another pair of laser cutting apparatuses 14 simultaneously trims another part. The system 110 also includes the robots 24 transferring the parts to and from the cutting station 20, and the two inner chambers 22 with the double doors 16, 18. The system 110 of FIG. 5 also includes the conveyor 38 with the cutting platforms 34, 36 sliding the parts to and from the robots 24. However, unlike the system 10 of FIG. 1, the system 110 of FIG. 5 does not include the load slide 26 and loading platform 28 conveying the parts in and out of the inner chamber 22. Instead, one of the robots 24 is disposed in each inner chamber 22, and the human operator 30 preloads and unloads the parts directly to and from the robot 24. The first doors 16 to the inner chambers 22 are located along the same one of the first walls 11, and the second doors 18 are each disposed along a second wall facing perpendicular to the first doors 16 and toward the laser cutting station 20. The first doors 16 are between the part loading area 32 and the inner chambers 22, and the second doors 18 are between the inner chambers 22 and the laser cutting station 20. As shown in FIG. 5, the inner chamber 22 is large enough to hold one of the robots 24 and allow the robot 24 to rotate at least 90 degrees between the first door 16 and the second door 18.

In the system 110 of FIG. 5, the operator 30 conveys an untrimmed first pair of parts 1 through the first door 16 directly to the robot 24, while the second door 18 is closed. The robot 24 then rotates 90 degrees, conveys the first pair of parts 1 through the second door 18 while the first door 16 is closed, and places the first pair of parts 1 on the first cutting platform 34. After the first pair of parts 1 is trimmed, the robot 24 lifts the trimmed first pair of parts 1 off the first cutting platform 34, and conveys the parts through the second door 18 into the inner chamber 12 while the first door 16 is closed. The robot 24 then rotates 90 degrees, and conveys the trimmed first pair of parts 1 through the first door 16 and directly back to the operator 30 in the part loading area 32 while the second door 18 is closed. As in the system 10 of FIG. 1, the preloading and unloading steps on both sides of the enclosed cell 12 are repeated continuously to maximize the laser cutting time.

Figure 6:
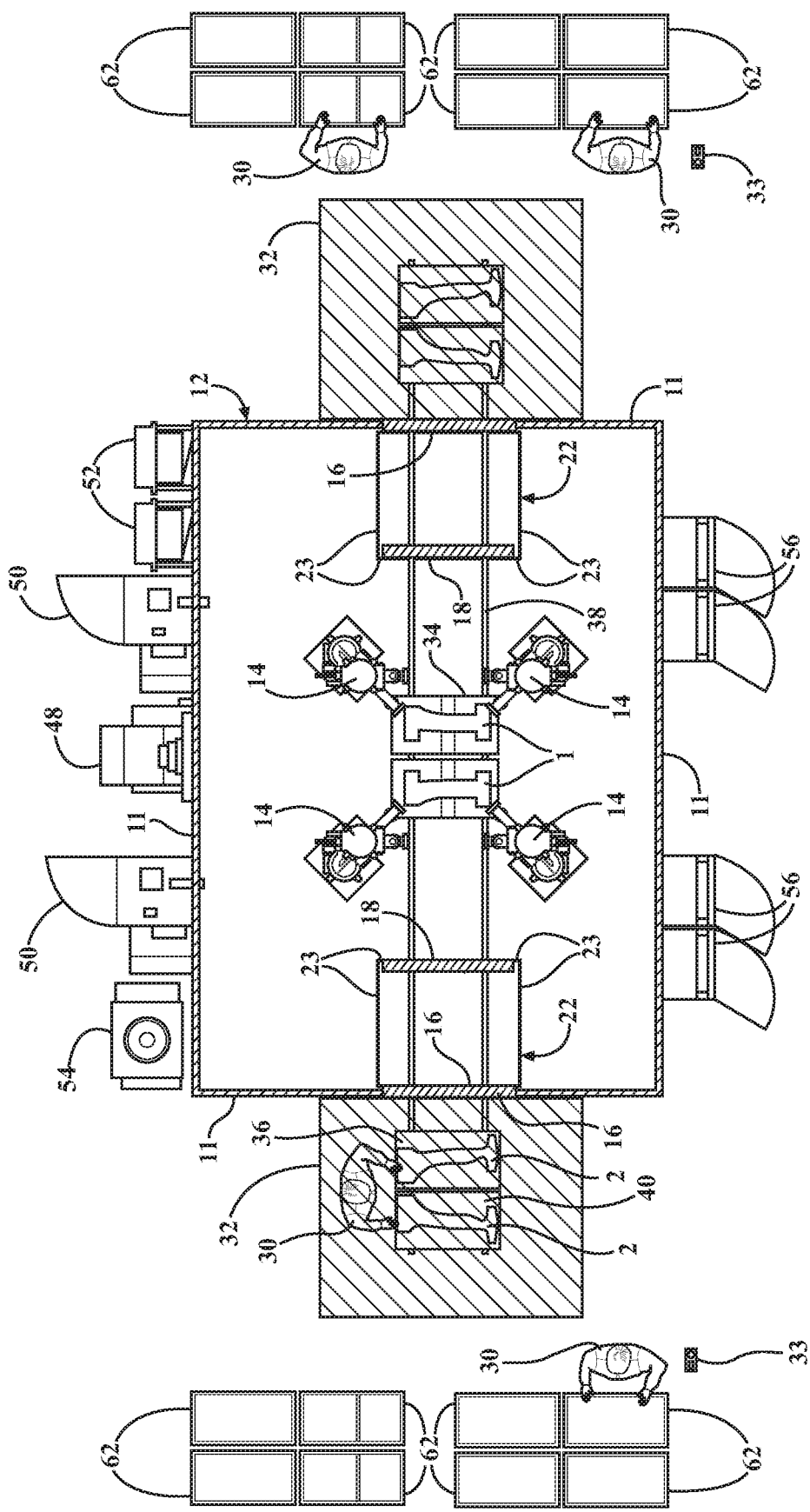
FIG. 6 is a plan view of a robotic laser cutting system according to a third exemplary embodiment.

FIG. 6 illustrates the laser cutting system 210 according to a third exemplary embodiment, which is even less automatic and requires more labor than the laser cutting system 110 of FIG. 5. Like the systems 10, 110 of FIGS. 1 and 5, the system 210 of FIG. 6 includes two laser cutting apparatuses 14 simultaneously cutting one part while the other two laser cutting apparatuses 14 simultaneously trim another part. The system 210 of FIG. 6 also includes the two inner chambers 22 with the double doors 16, 18, the two cutting platforms 34, 36 and the conveyor 38 sliding the parts to and from the cutting station 20.

However, unlike the systems 10, 110 of FIGS. 1 and 5, the part loading areas 32 and the inner chambers 22 of the system 210 of FIG. 6 are located on opposite sides of the enclosed cell 12. The first doors 16 are disposed along first walls 11 facing opposite one another, and the second doors 18 are disposed along second walls 23 parallel to the first doors 16 and facing toward the laser cutting station 20. In addition, the system 210 of FIG. 6 does not include the robots 24 transferring the parts from the inner chambers 22 to the cutting station 20. Instead, the conveyor 38 extends continuously from one part loading area 32, through one of the inner chambers 22 and doors 16, 18, through the cutting station 20, through the second inner chamber 22 and doors 16, 18, and to the opposite part loading area 32. The first cutting platform 34 moves back and forth between the pair loading area 32 on the right side of the enclosed cell 12 and the cutting station 20 while the second cutting platform 36 moves back and forth between the cutting station 20 and the part loading area 32 on the left side of the enclosed cell 12, independent of the first cutting platform 34.

In the system 210 of FIG. 6, the operator 30 loads the first pair of parts 1 onto the first cutting platform 34 in the part loading area 32, the conveyor 38 transfers the first pair of parts 1 through the first door 16 and into the inner chamber 22 while the second door 18 is closed, and then through the second door 18 while the first door 16 is closed. The conveyor 38 then transfers the first pair of parts 1 directly to the laser cutting station 20. While the first pair of parts 1 is being trimmed, the second pair of parts 2 is preloaded and conveyed through the double doors 16, 18 on the left side of the enclosed cell 12, and waits on the second cutting platform 36 directly adjacent the cutting station 20. As soon as the laser cutting apparatuses 14 finish cutting the first pair of parts 1, the first and second platforms 34, 36 immediately move to the right so that the untrimmed second pair of parts 2 is disposed at the cutting station 20 and the trimmed first pair of parts 1 is conveyed back through the same set of double doors 16, 18 and to the part loading area 32 on the right side of the enclosed cell 12. The operator 30 unloads the trimmed first pair of parts 1 directly from the first cutting platform 34 and preloads an untrimmed third pair of parts (not shown) onto the first cutting platform 34 while the second pair of parts 2 is being trimmed. Again, the preloading and unloading steps on both sides of the enclosed cell 12 are preferably repeated continuously to maximize the laser cutting time.

Figure 7:
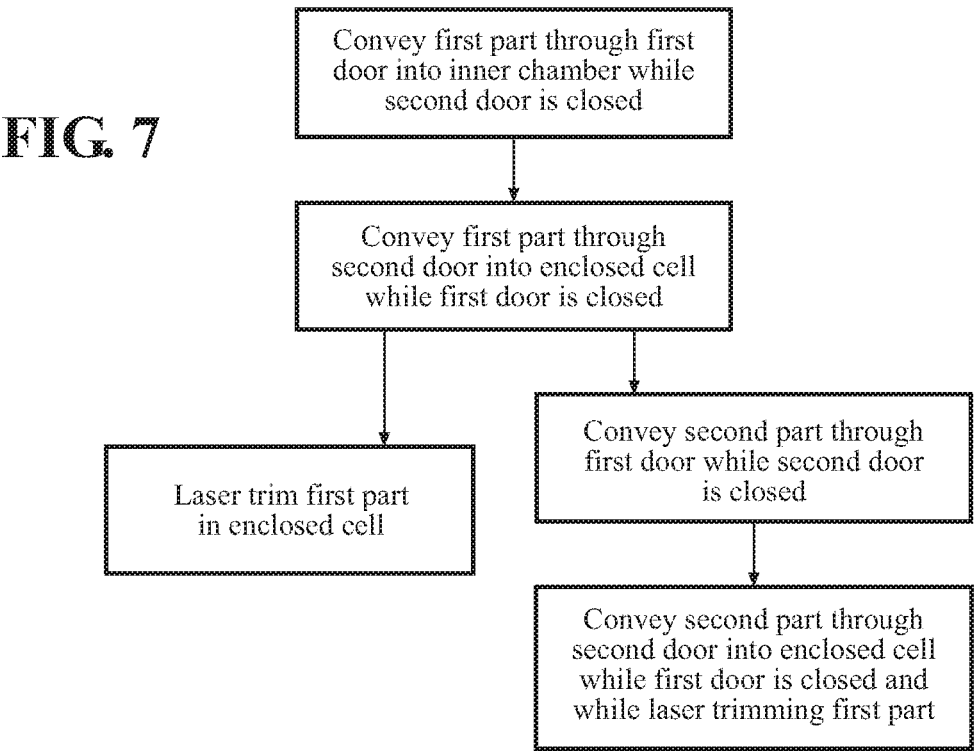
FIG. 7 is a flow chart of an exemplary laser cutting method.

The invention also provides a method for laser cutting the parts. The method generally comprises laser cutting one part using the plurality of laser cutting apparatuses 14 while conveying another part though the double doors 16, 18 and into the enclosed cell 12 such that no laser light can escape the enclosed cell 12 and the lasers 14 can run continuously. As illustrated in FIG. 7, the method typically includes conveying a first part through the first door 16 into the inner chamber 22 while the second door 18 is closed, followed by conveying the first part through the second door 18 into the enclosed cell 12 while the first door 16 is closed. The method next includes laser cutting the first part in the enclosed cell 12 while conveying a second part through the first door 16 into the inner chamber 22 while the second door 18 is closed, followed by conveying the second part through the second door 18 into the enclosed cell 12 while the first door 16 is closed.

Figure 8:
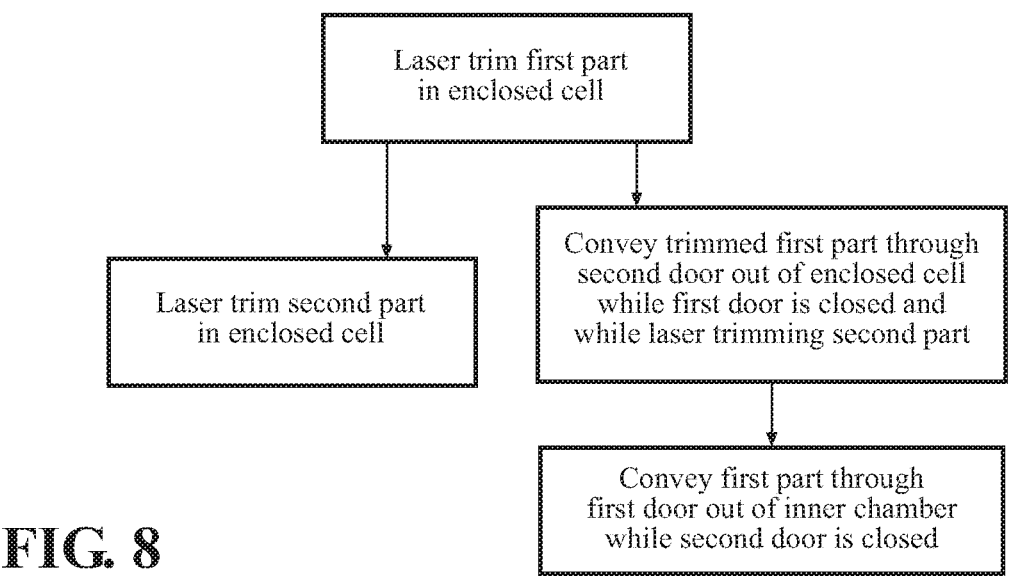
FIG. 8 is a flow chart of another exemplary laser cutting method.

The method also generally comprises laser cutting one part using the plurality of laser cutting apparatuses 14 while conveying another part though the double doors 16, 18 and out of the enclosed cell 12 such that no laser light can escape the enclosed cell 12 and the laser cutting apparatuses 14 can run continuously. As illustrated in FIG. 8, the method includes laser cutting the first part in the enclosed cell 12, followed by laser cutting the second part in the enclosed cell 12. While laser cutting the second part, the method includes conveying the trimmed first part through the second door 18 and out of the enclosed cell 12 while the first door 16 is closed, followed by conveying the second part through the first door 16 and out of the inner chamber 22 while the second door 18 is closed.

The method can vary depending on the specific system used, but a first exemplary method can be conducted using the system 10 shown in FIG. 1. The exemplary method includes disposing a first pair of parts 1 on the loading platform 28 on the right side of the part loading area 32, outside of the enclosed cell 12, and disposing a second pair of parts 2 on the other loading platform 28 on the left side of the part loading area 32, outside of the enclosed cell 12. The human operator 30 disposes the metal parts on the part loading platforms 28 in the embodiment of FIG. 1, but alternatively the metal parts could be automatically placed on the part loading platforms 28 by a robot. Next, the method includes opening the first doors 16 into the associated inner chamber 22 while the associated second doors 18 are closed, sliding the pairs of parts 1, 2 through the first doors 16 and into the inner chambers 22 while the second doors 18 are still closed, closing the first doors 16, and then opening the second doors 18 to the enclosed cell 12 while the first doors 16 are closed. The first pair of parts 1 and second pair of parts 2 can be conveyed into the enclosed cell 12 at the same time, or different times.

Next, the first exemplary method includes lifting the pairs of parts 1, 2 out of the inner chambers 22 and transferring the pairs of parts 1, 2 to the laser cutting station 20. This step is conducted by the robots 24. At the onset of the first exemplary method, a first cutting platform 34 is disposed to the right of the cutting station 20 and a second cutting platform 36 is disposed at the cutting station 20. The robot 24 on the right side of the cutting station 20 lifts the first pair of parts 1 out of the inner chamber 22, rotates 90 degrees clockwise, and places the first pair of parts 1 on the first cutting platform 34. While the first pair of parts 1 is being transferred to the first cutting platform 34, the robot 24 on the left side of the cutting station 20 lifts the second pair of parts 2 out of the inner chamber 22, rotates 90 degrees counterclockwise, and holds the second pair of parts 2. The method then includes sliding the cutting platforms 34, 36 to the left, along the conveyor 38, such that the first cutting platform 34 and the first pair of parts 1 are disposed at the cutting station 20 and the second cutting platform 36 is disposed to the left of the cutting station 20, as shown in FIG. 1.

The first exemplary method next includes cutting the first pair of parts 1 using the plurality of laser cutting apparatuses 14. The cutting step can include any type of laser trimming or cutting technique. Two of the laser cutting apparatuses 14 trim one part, and the other two laser cutting apparatuses 14 trim the other part, such that the parts are trimmed simultaneously. While the first pair of parts 1 is being trimmed, the method includes preloading the second pair of parts 2 on the second cutting platform 36. The robot 24 on the left side of the cutting station 20 preloads the second pair of parts 2 by placing them on the second cutting platform 36, as shown in FIG. 1. Thus, the second pair of parts 2 is waiting and ready for trimming, so that immediately after the first pair of parts 1 is trimmed, the method includes sliding the cutting platforms 34, 36 along the conveyor 38 to the right so that the second pair of parts 2 is disposed at the cutting station 20 and the first pair of parts 1 is disposed to the right of the cutting station 20. The only time that the laser cutting apparatuses 14 are off is when the conveyor 38 is moving the parts along the conveyor 38 into and out of the cutting station 20, and this time period is very short because the second pair of parts 2 is waiting and ready on the second cutting platform 36 directly adjacent the cutting station 20.

The method next includes cutting the second pair of parts 2. While the second pair of parts 2 is being trimmed, the method includes unloading the first pair of parts 1 by lifting them off the first cutting platform 34, placing them in the inner chamber 22, and sliding them out of the inner chamber 22. The robot 24 on the right side of the cutting station 20 unloads the first pair of parts 1 by lifting them off the first platform 34, rotating 90 degrees counterclockwise, and then placing them on the loading platform 28 in the inner chamber 22. The double doors 16, 18 are again used to prevent light from escaping the enclosed cell 12 as the trimmed first pair of parts 1 exit the cell 12. This step includes opening the second door 18, placing the first pair of parts 1 in the inner chamber 22 while the first door 16 is closed, and sliding the first pair of parts 1 through the first door 16 and out of the inner chamber 22 while the second door 2 is closed. Since no laser light can escape the enclosed cell 12, the lasers 14 can continue cutting the second pair of parts 2 while the first pair of parts 1 exits the enclosed cell 12.

Also while the second pair of parts 2 is being trimmed, the robot 24 on the right side of the cutting station 20 preloads the third pair of parts 3 onto the first cutting platform 34 for trimming immediately after the second pair of parts 2 are trimmed. In the embodiment of FIG. 1, the robots 24 are capable of holding two pairs of parts at the same time so that the third pair of parts 3 can be placed on the first cutting platform 34 within seconds after the first pair of parts 1 is removed from the first cutting platform 34. For example, the robot 24 can include an arm having a part holder on each side of the arm. The robot 24 can pick up the untrimmed third pair of parts 3 from the inner chamber 22, rotate 90 degrees clockwise, and hold the third pair of parts 3 on one side of the arm while waiting for the first pair of parts 1 to be trimmed. Once the first pair of parts 1 is trimmed, the robot 24 then picks up the first pair of parts 1 from the first cutting platform 34, on the opposite side of the arm, and places the third pair of parts 3 on the first cutting platform 34. Next, the robot 24 rotates 90 counterclockwise back to the inner chamber 22, picks up a fourth pair 4 of untrimmed parts from the loading platform 28 while still holding the trimmed first pair of parts 1, and then places the trimmed first pair of parts 1 on the loading platform 28. The first pair of parts 1 exits the inner chamber 22 and is removed from the loading platform 28 while the robot 24 rotates 90 degrees clockwise and transfers the untrimmed fourth pair of parts 4 to the cutting station 20.

Also while the second pair of parts 2 is being trimmed, the robot 24 on the left side of the cutting station 20 receives a fifth pair of parts 5 through the double doors 16, 18 for trimming immediately after the third pair of parts 3. After the second pair of parts 2 is trimmed, the method includes sliding the cutting platforms 34, 36 along the conveyor 38 to the left so that the first platform 34 and third pair of parts 3 is disposed at the cutting station 20, and the trimmed second pair of parts 2 and the second cutting platform 36 is disposed to the left of the cutting station 20. The method then includes cutting the third pair of parts 3 while unloading the trimmed second pair of parts 2 and preloading the untrimmed fifth pair of parts 5 using the robots 24, in the same manner as previously described with regard to the first pair of parts 1 and the third pair of parts 3. Meanwhile, a sixth pair of parts 6 waits on the loading platform 28 on the left side of part loading area 32 for subsequent preloading by the robots 24. The laser cutting apparatuses 14 continuously trim the parts, except when the parts are sliding along the conveyor 38. The first exemplary method also includes continuously placing untrimmed parts on the loading platforms 28 or removing trimmed parts from the loading platforms 28, while the laser cutting apparatuses 14 are cutting the parts.

Although the first exemplary method includes cutting the first pair of parts 1 followed by the second pair of parts 2, the method could alternatively include cutting the second pair of parts 2 before the first pair of parts 1. The method can vary from the exemplary embodiment described, depending on the number of double doors 16, 18, inner chambers 22, and laser cutting apparatuses 14 employed, and depending on whether the other components are used.

For example, a second exemplary method can be conducted using the system 110 of FIG. 5, which includes the robots 24 disposed in the inner chambers 22, and does not include the loading platforms 28 and load slide 26. The second exemplary method is similar to the first exemplary method, except the second exemplary method includes manually preloading the parts by lifting the parts through the first door 16 and providing the parts directly to the robot 24 disposed in the inner chamber 22 while the second door 18 is closed, instead of preloading the parts on the loading platforms 28 of the load slide 26. The method of FIG. 5 then includes rotating the robot 24 90 degrees and conveying the parts through the second door 18 and to one of the cutting platforms 34, 36 while the first door 16 is closed.

As in the first exemplary method, when the first pair of parts 1 is being trimmed, the second pair of parts 2 waits on the second cutting platform 36 to the left of the cutting station 20. Once the first pair of parts 1 is trimmed, the first cutting platform 34 and the second cutting platform 36 slides to the right so that the trimmed first pair of parts 1 can be unloaded by the robot 14 and the second pair of parts 2 is located at the cutting station 20 for cutting by the laser cutting apparatuses 14. Also, like the first exemplary method, the only time that the laser cutting apparatuses 14 are off is when the conveyor 38 is moving the parts into and out of the cutting station 20, and this time period is very short because the second pair of parts 2 is waiting and ready on the second cutting platform 36 directly adjacent the cutting station 20.

In the second exemplary method, the robot 14 lifts the trimmed first pair parts 1 off of the cutting platform 34, moves through the second door 18 to the inner chamber 22 while the first door 16 is closed, and rotates 90 degrees to the first door 16. The operator 30 then manually unloads the trimmed first pair of parts 1 from the robot 24 and preloads an untrimmed third pair of parts (not shown) to the robot 24 for subsequent cutting. The parts are continuously preloaded and unloaded on both sides of the enclosed cell 12 while the laser cutting apparatuses 14 trim other parts to maximize the laser cutting time.

A third exemplary method can be conducted using the system 210 of FIG. 6, which includes the conveyor 38 extending through the enclosed cell 12, and no robots 24. The method includes manually preloading an untrimmed first pair of parts 1 on the right side of the enclosed cell 12 by lifting the parts through the first door 16 and placing the parts on the first cutting platform 34 of the conveyor 38 while the second door 18 is closed. The method then includes transferring the first pair of parts 1 along the conveyor 38 through the second door 18 while the first door 16 is closed and then directly to the cutting station 20. As in the other exemplary methods, two of the laser cutting apparatuses 14 simultaneously trim one part while the other two laser cutting apparatuses 14 simultaneously trim another part.

While the first pair of parts 1 is being trimmed, the second pair of parts 2 is preloaded and conveyed through the double doors 16, 18 on the left side of the enclosed cell 12, and waits on the second cutting platform 36 directly adjacent the cutting station 20. As soon as the laser cutting apparatuses 14 finish cutting the first pair of parts 1, the method includes immediately conveying both the first and second platforms 34, 36 to the right so that the untrimmed second pair of parts 2 is disposed at the cutting station 20. The trimmed first pair of parts 1 is conveyed back through the same set of double doors 16, 18 and to the part loading area 32 on the right side of the enclosed cell 12. As in the other exemplary methods, the only time that the laser cutting apparatuses 14 are off is when the conveyor 38 is moving the parts into and out of the cutting station 20, and this time period is very short because the second pair of parts 2 is waiting and ready on the second cutting platform 36 directly adjacent the cutting station 20.

In the exemplary method of FIG. 6, the operator 30 unloads the trimmed first pair of parts 1 directly from the first cutting platform 34 and preloads an untrimmed third pair of parts (not shown) onto the first cutting platform 34 while the second pair of parts 2 is being trimmed. The untrimmed third pair of parts is conveyed through the double doors 16, 18 on the right side of the enclosed cell 12 and waits adjacent to the cutting station 20 for the laser cutting apparatuses 14 to finish cutting the second pair of parts 2. As soon as the laser cutting apparatuses 14 finish cutting the second pair of parts 2, the method includes moving both the first and second cutting platforms 34, 36 to the left so that the third pair of parts is disposed at the cutting station 20. The third pair of parts is then trimmed. The preloading and unloading steps on both sides of the enclosed cell 12 are repeated continuously to maximize the laser cutting time.

Obviously, many modifications and variations of the present invention are possible in light of the above teachings and may be practiced otherwise than as specifically described while within the scope of the claims.

What is claimed is:

1. A laser cutting method, comprising the steps of:
    laser cutting at least one first part in a cell enclosed by a plurality of first walls;
    maintaining at least one second part in the enclosed cell adjacent the at least one first part while laser cutting the at least one first part;
    laser cutting the at least one second part at a laser cutting station in the cell enclosed by the plurality of first walls;
    transferring at least one third part through a first door and into a first inner chamber while a second door connecting the first inner chamber to the enclosed cell is closed and while laser cutting the at least one first part or the at least one second part; and
    wherein at least one robot transfers at least one of the parts to the laser cutting station, the at least one robot includes a first robot and a second robot, the first robot is located between the first inner chamber and the laser cutting station, and the second robot is located between a second inner chamber and the laser cutting station.

2. The method of claim 1 including laser cutting the at least one second part after laser cutting the at least one first part; transferring the at least one first part through the second door into the first inner chamber and out of the enclosed cell while the first door is closed and while laser cutting the at least one second part; and transferring the at least one third part through the first door and into the first inner chamber while laser cutting the at least one first part.

3. The method of claim 2 including transferring the at least one third part from the first chamber through the second door and into the enclosed cell while the first door is closed; and maintaining the at least one third part in the enclosed cell adjacent the at least one second part while laser cutting the at least one second part.

4. The method of claim 3 including transferring the at least one first part through the first door and out of the first inner chamber while the second door is closed; and transferring at least one fourth part through the first door and into the first inner chamber while the second door is closed and while laser cutting the at least one second part.

5. The method of claim 4 including transferring at least one fifth part through a first door and into the second inner chamber while a second door connecting the second inner chamber to the enclosed cell is closed and while laser cutting the at least one second part.

6. The method of claim 5 including laser cutting the at least one third part after laser cutting the at least one second part; transferring the at least one second part through the second door out of the enclosed cell and into the second inner chamber while the first door is closed and while laser cutting the at least one third part.

7. The method of claim 1 including transferring the at least one third part through the second door from the first inner chamber to the enclosed cell; and rotating the at least one third part 90 degrees after transferring the at least one of third part through the second door and before laser cutting the at least one third part.

8. The method of claim 1, wherein the step of transferring the at least one third part through a first door and into a first inner chamber while a second door connecting the first inner chamber to the enclosed cell is closed and while laser cutting the at least one first part or the at least one second part.

9. The method of claim 1, wherein the at least one robot transfers at least one of the parts from the first inner chamber to the laser cutting station and/or from the laser cutting station to the first inner chamber.

10. The method of claim 1, wherein the robots convey the parts to and from the first and second inner chambers simultaneously.

11. The method of claim 1 including sliding the parts between the first inner chamber and the laser cutting station.

12. A laser cutting system, comprising:
a cell enclosed by a plurality of first walls;
at least one laser cutting apparatus disposed in said enclosed cell for cutting at least one part;
at least one inner chamber disposed along said enclosed cell, said at least one inner chamber enclosed by at least one of said first walls and at least one second wall, and said at least one inner chamber includes a first inner chamber and a second inner chamber;
a first door disposed along one of said first walls for allowing the at least one part to pass therethrough;
a second door disposed along one of said second walls for allowing the at least one part to pass therethrough, wherein only one of said doors is open at a time while said at least one laser cutting apparatus cuts the at least one part; and
at least one robot for transferring said at least one part to and/or from a laser cutting station including said at least one laser cutting apparatus, said at least one robot includes a first robot and a second robot, said first robot is located between said first inner chamber and said laser cutting station, said second robot is located between said second inner chamber and said laser cutting station.

13. The laser cutting system according to claim 12, wherein said at least one robot includes a material handling robot.

14. The laser cutting system according to claim 12, wherein said at least one robot transfers said at least one part from said at least one inner chamber to said laser cutting station and/or from said laser cutting station to said at least one inner chamber.

15. The laser cutting system according to claim 1, wherein said at least one part includes a plurality of parts, and said robots convey said parts to and from said first and second inner chambers simultaneously.

16. The laser cutting system according to claim 12 including a slide between said at least one inner chamber and said laser cutting station for conveying said at least one part to and/or from said laser cutting station.

17. The laser cutting system according to claim 12 including least one cutting platform which slides the at least one part in and/or out of the laser cutting station.

* * * * *